(12) United States Patent
Chae et al.

(10) Patent No.: US 8,345,200 B2
(45) Date of Patent: Jan. 1, 2013

(54) LIQUID CRYSTAL DISPLAY DEVICE HAVING ORGANIC ALIGNMENT LAYER AND FABRICATION METHOD THEREOF

(75) Inventors: Gee-Sung Chae, Incheon (KR); Jin-Wuk Kim, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 13/253,769

(22) Filed: Oct. 5, 2011

(65) Prior Publication Data

US 2012/0026441 A1 Feb. 2, 2012

Related U.S. Application Data

(60) Division of application No. 12/821,090, filed on Jun. 22, 2010, now Pat. No. 8,039,063, which is a continuation of application No. 11/385,914, filed on Mar. 22, 2006, now Pat. No. 7,755,731.

(30) Foreign Application Priority Data

Dec. 30, 2005 (KR) ................. 136172/2005

(51) Int. Cl.
*G02F 1/1337* (2006.01)
*C09K 19/56* (2006.01)

(52) U.S. Cl. ........ 349/131; 428/1.2; 428/1.23; 349/123; 349/129

(58) Field of Classification Search ................... 428/1.2, 428/1.23; 349/123, 129, 131
See application file for complete search history.

(56) References Cited

U.S. PATENT DOCUMENTS

| | | | |
|---|---|---|---|
| 7,755,731 B2 * | 7/2010 | Chae et al. ................... 349/123 |
| 8,039,063 B2 * | 10/2011 | Chae ............................... 428/1.1 |
| 2004/0169809 A1 | 9/2004 | Yamabuchi et al. |
| 2004/0262402 A1 | 12/2004 | Wilderbeek et al. |
| 2005/0003110 A1 | 1/2005 | Tanaka et al. |
| 2005/0245085 A1 | 11/2005 | Yoo |

FOREIGN PATENT DOCUMENTS

| | | |
|---|---|---|
| CN | 1568441 | 1/2005 |
| CN | 1625715 A | 6/2005 |
| CN | 1693955 | 11/2005 |
| EP | 1020 756 | 7/2000 |
| TW | 559681 | 11/2003 |
| TW | 594288 | 6/2004 |

* cited by examiner

*Primary Examiner* — Shean C Wu
(74) *Attorney, Agent, or Firm* — Morgan, Lewis & Bockius LLP

(57) ABSTRACT

An alignment structure of a liquid crystal display device includes a substrate, a plurality of region defining strips disposed at intervals on the substrate, and organic alignment strips disposed between the region defining layers.

7 Claims, 2 Drawing Sheets

LIQUID CRYSTAL DISPLAY DEVICE HAVING ORGANIC ALIGNMENT LAYER AND FABRICATION METHOD THEREOF

This is a divisional application of copending application Ser. No. 12/821,090, filed Jun. 22, 2010 now U.S. Pat. No. 8,039,063, which is a continuation of U.S. patent application Ser. No. 11/385,914, filed Mar. 22, 2006 now U.S. Pat. No. 7,555,731, both of which are hereby incorporated by reference. The present invention also claims the benefit of Korean Patent Application No. 136172/2005 filed in Korea on Dec. 30, 2005, which is hereby incorporated by reference.

BACKGROUND OF THE INVENTION

1. Field of the Invention

The present invention relates to a display device, and more particularly, to an liquid crystal display (LCD) device and a fabrication method thereof. Although the present invention is suitable for a wide scope of applications, it is particularly suitable for an organic alignment layer for aligning liquid crystal molecules without rubbing.

2. Description of the Related Art

In general, an LCD device is a display device for displaying images by controlling a transmittance of light through a liquid crystal layer by using refractivity anisotropy of liquid crystal molecules. In order to obtain uniform brightness and a high contrast ratio in the LCD device, an alignment must be performed so as to align the liquid crystal molecules in a predetermined direction. Currently, an alignment method by rubbing is commonly used. According to the alignment method by rubbing, an alignment film made of a material, such as polyimide, etc., is coated on a substrate, which is then rubbed by using a rubbing roll having an alignment cloth. Thus, uniform micro-grooves are formed on the surface of the alignment film. Liquid crystal molecules are arranged in parallel to the micro-grooves on the surface of the alignment film so as to minimize elastic deformation energy.

The related art alignment method by rubbing has a problem in that if the micro-grooves formed on the surface of the alignment film are defective, phase distortion and light scattering may occur, which undesirably degrades the performance of the LCD device. In addition, rubbing causes the generation of dust and static electricity on the alignment film, which undesirably degrades a production yield and damages the substrate. Moreover, for a large-sized LCD device built on a large substrate, a large-scale heavy rubbing roll must be used for rubbing the corresponding large substrate, and in such case, it is quite difficult to perform proper rubbing on the entire surface of the substrate with the rubbing roll applying a uniform pressure.

SUMMARY OF THE INVENTION

Accordingly, the present invention is directed to an LCD device and a fabrication method thereof that substantially obviate one or more of the problems due to limitations and disadvantages of the related art.

An object of the present invention is to provide an alignment film for an LCD device without performing a rubbing process.

Another object of the present invention is to provide a self-arranging organic alignment film for an LCD device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the present invention, as embodied and broadly described herein, there is provided a method for fabricating an alignment film includes: providing a substrate; forming a plurality of region defining strips at an interval on the substrate; and forming organic alignment strips for aligning liquid crystal molecules between the region defining strips by applying an organic alignment material on the substrate.

In another aspect, an alignment structure of a liquid crystal display device includes a substrate, a plurality of region defining strips disposed at intervals on the substrate, and organic alignment strips disposed between the region defining layers.

In another aspect, a method for fabricating a liquid crystal display device includes: providing first and second substrates; forming a plurality of region defining strips at an interval on the first and second substrates; forming organic alignment strips between the region defining strips by applying an organic alignment material on the first and second substrates; and forming a liquid crystal panel by attaching the first and second substrates.

In yet another aspect, a liquid crystal display device includes: first and second substrates; a plurality of region defining strips disposed at intervals on the substrates; organic alignment strips disposed between the region defining strips; and a liquid crystal layer formed between the first and second substrates.

The foregoing and other features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1A:
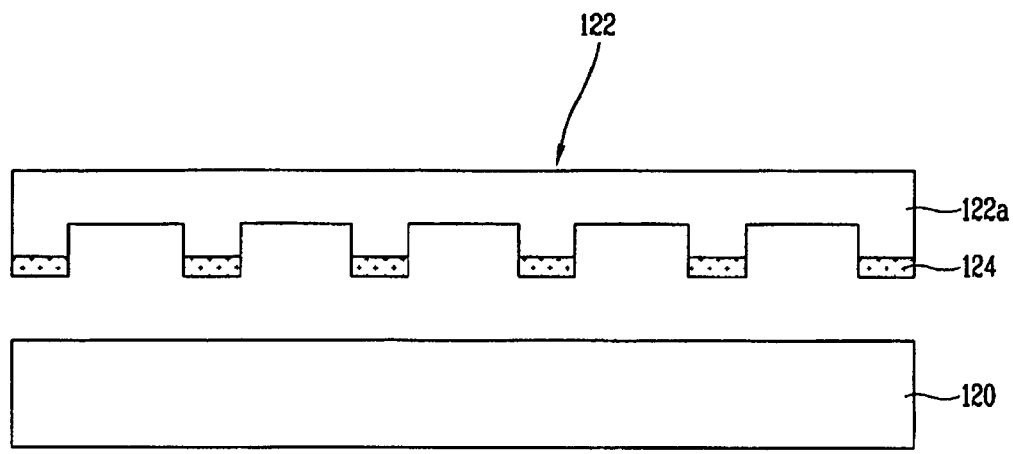
FIGS. 1A to 1C show sequential processes of an exemplary method for forming organic alignment strips in accordance with an embodiment of the present invention.

Reference will now be made in detail to the preferred embodiments of the present invention, examples of which are illustrated in the accompanying drawings.

Embodiments of the present invention provides an alignment film for aligning liquid crystal molecules in a predetermined direction without performing rubbing, and a method for fabricating the alignment film. More particularly, liquid crystal molecules are aligned according to chemical characteristics of the alignment film, rather than being aligned by morphological micro-grooves formed on the alignment film through a rubbing process. The alignment film is made of an organic material. When the organic alignment film material is coated on the substrate, a top of the chain in the organic material chemically interact with the liquid crystal molecules, and thus the liquid crystal molecules are aligned along the tops of the chains. Accordingly, to align the liquid crystal molecules in a desired direction, the tops of the chains in the organic alignment material need to be arranged in a desired direction.

To arrange the tops of the chains in the organic alignment material in a desired direction, a region defining material is first coated to define regions of the organic alignment film. The arrangement of the chains in the organic alignment material, which interact with the liquid crystal molecules, is determined depending on the size of the regions coated by the organic alignment material. The region defining material and an organic alignment layer are alternately formed on the substrate as strips extending in an alignment direction to thereby arrange the organic alignment material in the alignment direction and to align the liquid crystal molecules in the alignment direction.

The region defining material and the organic alignment material have opposite hydroscopic characteristics. More particularly, the region defining material is hydrophilic while the organic alignment material is hydrophobic. Thus, they are self-assembled monolayer materials that form strips with a pre-set width by themselves as a result of repulsing each other when the organic alignment material is subsequently provided on the region defining material.

The organic alignment material in embodiments of the present invention can be N-(3-(trimethylsilyl)propyl)isonicotinamide whose chemical formula is as follows:

[Chemical formula 1]

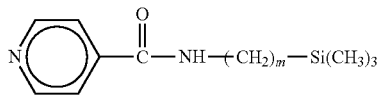

wherein 'm' is 1~30. In the organic alignment material, the pyridine group at the top of the chains interact with liquid crystal molecules for alignment thereof. In other words, the liquid crystal molecules are aligned along the alignment direction of the pyridine group at the tops of the organic chain.

The organic alignment material also contains a hydrophobic group, such as a trimethylsil group, that is used to form the organic alignment film as a series of alignment strips on the substrate in a self-arranged manner. The alignment film of the LCD device and its fabrication method in accordance with the present invention will now be described in more detail with reference to the accompanying drawings.

Figure 1B:
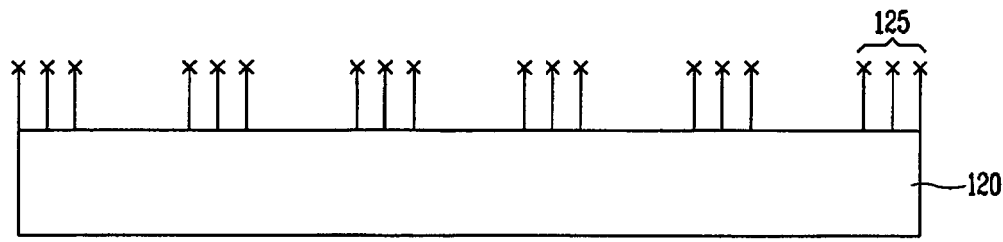
Figure 1C:
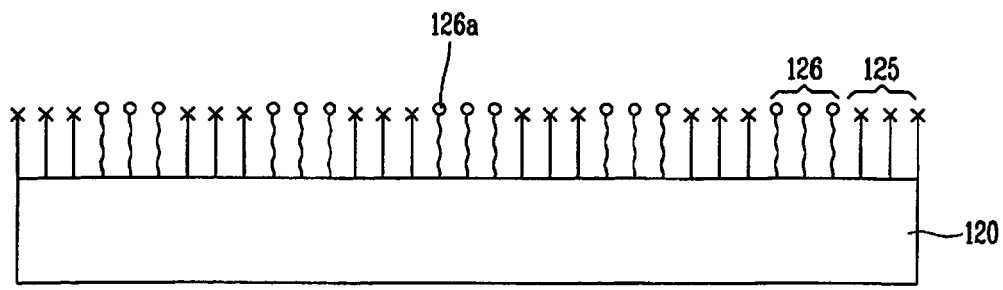

FIGS. 1A to 1C show sequential processes of an exemplary method for forming an organic alignment film in accordance with an embodiment of the present invention. The method for forming the organic alignment film, will be described in more detail with reference to FIGS. 1A to 1C. As shown in FIG. 1, a region defining material 124 is coated on convex portions 122a, which are at regular intervals, of a mold 122. One of the convex portions 122a of the mold 122 has the width of about 1~20 nm, and is spaced apart from an adjacent one of the concave portions 122a by about 1~20 nm.

A n-mercaptopentadecanoic acid can be used as the region defining material 124. The n-mercaptopentadecanoic acid includes a mercapto group and carboxyl group. The carboxyl group has a hydrophilic property, as shown in the following chemical formula:

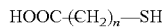 [Chemical formula 2]

wherein 'n' is 1~30.

As shown in FIG. 1B, when the convex portions 122a of the mold coated with the region defining material 124 contacts the substrate 120, which can be made of glass, the region defining material 124 is transferred onto the substrate 120 to form region defining strips 125 on the substrate 124. Such a deposition method using the mold 122 having the micro-convex portions is called a micro-contact printing process. Since the convex portion 122 has a width of about 1~20 nm, the region defining strips 125 formed on the substrate 120 also have a width of about 1~20 nm. The n-mercaptopentadecanoic acid for forming the region defining layer 125 is coated such that carboxyl group with hydrophilic characteristics at the top surface.

Subsequently, as shown in FIG. 1C, when the organic alignment material, such as ((trimethylsilyl)propyl)isonicotinamide is applied on the substrate 120, the hydrophobic trimethylsilyl group of the ((trimethylsilyl)propyl)isonicotinamide and the hydrophilic carboxyl group of the n-mercaptopentadecanoic acid repulse each other, causing the organic alignment strips 126 to be formed only between the region defining strips 125. The substrate 120 can be either showered with ((trimethylsilyl)propyl)isonicotinamide or submerged in ((trimethylsilyl)propyl)isonicotinamide) to form the organic alignment strips 126 only between the region defining strips 125

The region defining strips 125 are provided at an interval of about 1~10 nm on the substrate 120. Thus, the organic alignment strips 126 between the region defining strips 125 also have a width of about 1~10 nm. Accordingly, the organic alignment strips 126 are positioned between the region defining strips 125 because of the hydrophilic characteristic of the region defining strips and hydrophobic characteristic of the organic alignment material. Thus, the organic alignment strips 126 self-arrange themselves between the region defining strips 125. The ((trimethylsilyl)propyl)isonicotinamide together with and n-mercaptopentadecanoic acid can be considered a self-assembled mono layer (SAM) material. In other words, n-mercaptopentadecanoic acid can be called a primary SAM material and ((trimethylsilyl)propyl)isonicotinamide can be called a secondary SAM material.

The ((trimethylsilyl)propyl)isonicotinamide molecules positioned between the region defining strips 125 includes a propyl group at one end of the ((trimethylsilyl)propyl)isonicotinamide molecules adjacent to the substrate 120 and a pyridine group positioned at the other end of the ((trimethylsilyl)propyl)isonicotinamide molecules adjacent to the top surface of the organic alignment layer. The liquid crystal molecules interact with the pyridine groups so as to align themselves in the same direction as the organic alignment strips 126 are arranged between the region defining strips 125. In other words, the pyridine groups in the organic alignment strips 126 align the liquid crystal molecules. As shown in FIG. 1C, the molecules of ((trimethylsilyl)propyl)isonicotinamide positioned between the region defining strips 125 are arranged such that the pyridine groups 126a at one end of the ((trimethylsilyl)propyl)isonicotinamide molecules are at a top surface of the organic alignment strips 126 and the other end of the ((trimethylsilyl)propyl)isonicotinamide molecules are adjacent to the substrate 120.

When ((trimethylsilyl)propyl)isonicotinamide is positioned between the region defining strips 125, the ((trimethylsilyl)propyl)isonicotinamide molecules are arranged in a stable energy state such that propyl group is positioned at one end of the ((trimethylsilyl)propyl)isonicotinamide molecule and pyridine group is positioned at the other end of the ((trimethylsilyl)propyl)isonicotinamide molecule. However, an ((trimethylsilyl)propyl)isonicotinamide molecule can interact with adjacent ((trimethylsilyl)propyl)isonicotinamide molecules. These interactions can cause non-uniform arrangements of ((trimethylsilyl)propyl)isonicotinamide molecules at unstabilized energy states. The amount or degree of such interactions depend on the width of the coated organic alignment strips 126. Thus, the arrangement state or alignment mechanism capability of the ((trimethylsilyl)propyl)isonicotinamide molecules depends on the width of the organic alignment strips 126.

Figure 2:
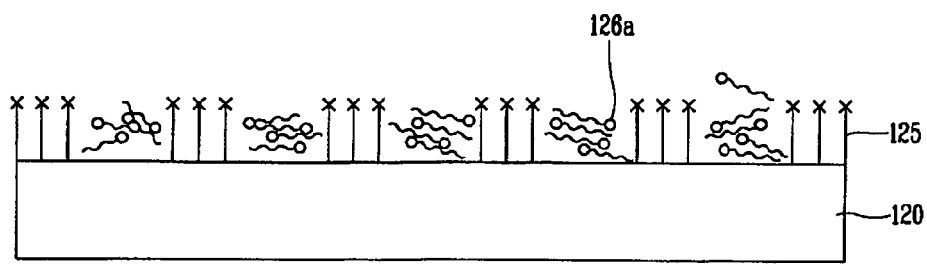
FIG. 2 is a view of an arrangement of organic alignment molecules in a wide organic alignment layer.

FIG. 2 is a view of an arrangement of organic alignment molecules in a wide organic alignment layer. As shown in FIG. 2, if the interval between the region defining strips 125 or the width of the organic alignment strips 126 is too wide, the ((trimethylsilyl)propyl)isonicotinamide molecules will lie on their sides or be irregularly distributed in a destabilized energy state. Since the pyridine groups of the ((trimethylsilyl)propyl)isonicotinamide molecules are not at the top surface of organic alignment layer, the liquid crystal molecules will interact with the pyridine groups of the ((trimethylsilyl)propyl)isonicotinamide molecules and thus not align the liquid crystal molecules along the organic alignment strips 126.

In embodiments of the present invention, the interval between the region defining strips 125 is 1~20 nm such that the ((trimethylsilyl)propyl)isonicotinamide molecules are arranged at a stabilized energy state, and pyridine groups 126a at one end of the ((trimethylsilyl)propyl)isonicotinamide molecules are at the top surface of the organic alignment strips 126 and the other end of the ((trimethylsilyl)propyl)isonicotinamide molecules are adjacent to the substrate 120. Accordingly, since the pyridine groups are arranged at the top surface of the organic alignment strips 126, the liquid crystal molecules can interact with the pyridine groups so as to be aligned in the same direction as the region defining strips 125 are arranged.

Figure 3:
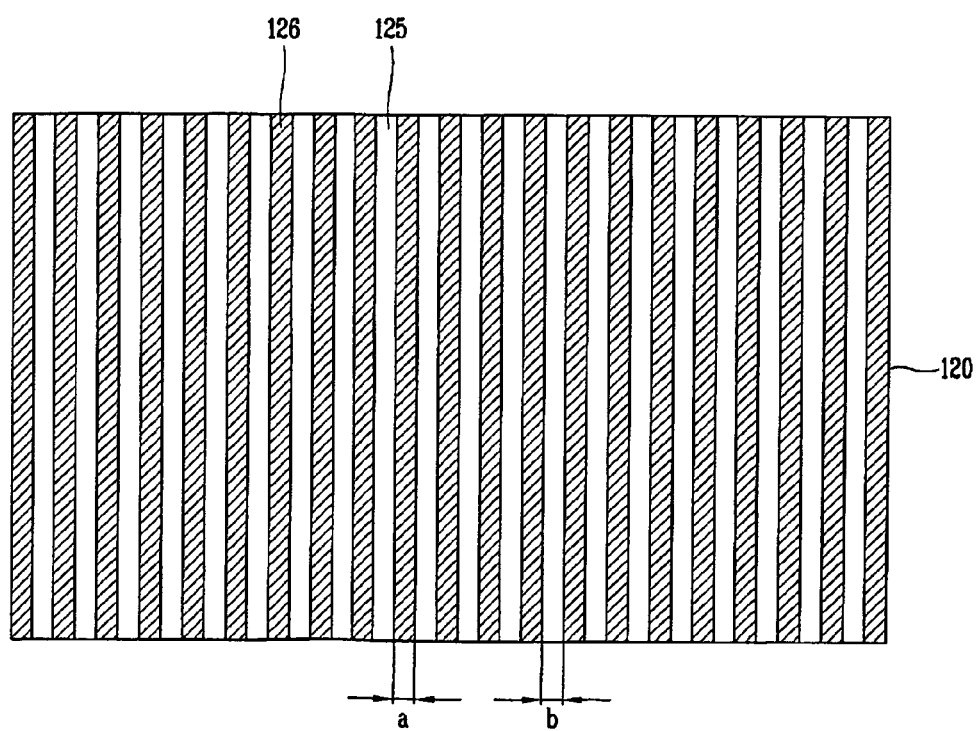
FIG. 3 is a plan view of a substrate with the organic alignment strips coated thereon in accordance with an embodiment of the present invention.

FIG. 3 is a plan view of a substrate with the organic alignment strips coated thereon in accordance with an embodiment of the present invention. As shown in FIG. 3, the region defining strips 125 and the organic alignment layers 126 are formed on the substrate 120. As shown in FIG. 3, the region defining strips 125 of n-mercaptopentadecanoic acid and the organic alignment strips 126 of ((trimethylsilyl)propyl)isonicotinamid are alternately formed on the substrate 120, and their widths ('a' and 'b') are about 1~20 nm, respectively. The direction of the region defining layers 125 and the organic alignment strips 126 is the alignment direction for the liquid crystal molecules. By changing the direction of the region defining layers 125 and the organic alignment strips 126, the alignment direction of liquid crystal molecules can be changed.

The substrate 120 can be a thin film transistor (TFT) substrate with a driving element array, such as an array of TFTs, formed thereon or a color filter substrate with a color filter layer formed thereon. Although not shown, a TFT substrate includes a plurality of gate lines and a plurality of data lines defining pixels therebetween. A TFT a pixel electrode is formed in each pixel, so that when the TFT is turned on, an image signal is applied to the pixel electrode. A color filter layer for implementing colors to be actually displayed can be formed on the color filter substrate.

Organic alignment strips 126 can be formed on one of or both the TFT substrate and on the color filter substrate. The TFT substrate and the color filter substrate are attached with a liquid crystal layer therebetween such that the LCD device is fabricated. After the TFT substrate and the color filer substrate are attached and then divided into unit liquid crystal panels, liquid crystals can be injected into the unit liquid crystal panel to form the liquid crystal layer. Alternatively, liquid crystal materials can be dropped onto at least one of the TFT substrate and the color filter substrate having a plurality of liquid crystal panels formed, and then, the two substrates are attached to make the liquid crystals spread between the TFT substrate and the color filter substrate, which are then divided into unit liquid crystal panels.

The alignment direction of organic alignment strips 126 on one of the substrates can be perpendicular or parallel with the organic alignment strips 126 on the other of the substrates. each other on the TFT substrate or the color filter substrate. The liquid crystal molecules can be aligned in the same direction as the orientation of the organic alignment layers between the region defining strips 125. In this respect, the arrangement direction of the organic alignment material is not defined by itself, but rather by the region defining strips 125. Thus, although the organic alignment material aligns the liquid crystal molecules interacting with them, in order to arrange the organic alignment material in the predetermined direction (namely, in the upward direction), the region defining material is also required. That is, since the region defining material substantially helps to align the liquid crystal molecules, it can be considered as an auxiliary alignment material for aligning the liquid crystal molecules. From this point of view, the n-mercaptopentadecanoic acid can be regarded as a primary alignment material while (trimethylsilyl)propyl)isonicotinamide can be regarded as a secondary alignment material.

Providing the region defining material and the organic alignment material as the SAM on the substrate is due to the hydrophilic group of the region defining material and the hydrophobic group of the organic alignment material. The hydrophilic group and hydrophobic group serve only to form the organic alignment strips as the SAM on the substrate, without affecting the alignment of the liquid crystal molecules. Thus, any organic compound can be applied in embodiments of the present invention so long as it has the region defining material containing a hydrophobic group and the organic alignment material containing a hydrophilic group.

In addition, the region determining material and the organic alignment material specified as particular materials in the above-described embodiment are merely examples for explaining an embodiment of the present invention. Any organic compound containing the chains that can interact with the liquid crystal molecules and a hydrophilic group (or hydrophobic group) can be used as the organic alignment material, and also, any organic compound containing the hydrophobic group (or hydrophilic group) that repulses the hydrophilic group (or hydrophobic group) of the organic alignment material can be used as the region defining material.

As so far described, the LCD device having the organic alignment layer and its fabrication method in accordance with the present invention have at least the following advantages. The organic alignment material containing the chains for aligning liquid crystal molecules in the predetermined direction by a interaction with them is simply coated onto the substrate by using a region defining material, and thus a rubbing process does not need to be performed. Therefore, a phase distortion and light spreading that may be generated during the rubbing process can be minimized or prevented. Also, since dust or static electricity is not generated on the alignment film, degradation of a production yield or damage of the substrate can be minimized or prevented. In addition, when large-scale substrates are processed for alignment, the uniform alignment anchoring force or surface affixing force can be sufficiently provided by the alignment strips on the liquid crystal molecules.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   first and second substrates;
   a plurality of region defining strips disposed at intervals on the substrates, the region defining strips being made of a region defining material including of a carboxyl group;
   organic alignment strips disposed between the region defining strips, the organic alignment material including a trimethylsil group and a pyridine group; and
   a liquid crystal layer formed between the first and second substrates.

2. The device of claim 1, wherein the region defining material is n-mercaptopentadecanoic acid (15-mercaptopentadecanoic acid) and the organic alignment material is N-(3-(trimethylsilyl)propyl)isonicotinamide.

3. The device of claim 1, wherein the organic alignment material positioned between the region defining strips is in a stable energy state.

4. The device of claim 1, wherein a width of the organic alignment strips is about 1~20 nm.

5. The device of claim 4, wherein a width of the region defining layer is about 1~20 nm.

6. The device of claim 4, wherein a first group at an end of a chain of the organic alignment material adjacent to the substrate is hydrophobic and a second group at an other end of the chain of the organic alignment material is an alignment group for aligning liquid crystal.

7. The device of claim 6, wherein the chain of the organic alignment material is substantially perpendicular to the substrate such that the alignment group is at a top surface of the organic alignment strips.

* * * * *